(12) United States Patent
Sasaki et al.

(10) Patent No.: US 9,292,302 B2
(45) Date of Patent: Mar. 22, 2016

(54) ALLOWING BYPASSING OF BOOT VALIDATION IN A COMPUTER SYSTEM HAVING SECURE BOOT ENABLED BY DEFAULT ONLY UNDER CERTAIN CIRCUMSTANCES

(71) Applicant: LENOVO (Singapore) PTE, LTD., New Tech Park (SG)

(72) Inventors: Ken Sasaki, Machida (JP); Eitaroh Kasamatsu, Kawasaki (JP); Yusaku Morishige, Fujisawa (JP); Kohsuke Ohtani, Tokyo (JP)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 289 days.

(21) Appl. No.: 13/736,382

(22) Filed: Jan. 8, 2013

(65) Prior Publication Data

US 2013/0191622 A1 Jul. 25, 2013

(30) Foreign Application Priority Data

Jan. 20, 2012 (JP) .................................. 2012-009980

(51) Int. Cl.
*G06F 9/44* (2006.01)
*G06F 21/57* (2013.01)

(52) U.S. Cl.
CPC ................ *G06F 9/4406* (2013.01); *G06F 9/44* (2013.01); *G06F 9/4401* (2013.01); *G06F 21/575* (2013.01)

(58) Field of Classification Search
CPC ..... G06F 21/575; G06F 21/572; G06F 21/57; G06F 9/44

USPC ............................................................. 713/2
See application file for complete search history.

(56) References Cited

U.S. PATENT DOCUMENTS

| 5,056,133 | A  | * | 10/1991 | Iida ............................ 379/93.07 |
| 7,263,589 | B2 | * | 8/2007  | Han et al. ...................... 711/163 |
| 7,318,151 | B1 | * | 1/2008  | Harris ............................... 713/2 |
| 8,214,652 | B2 | * | 7/2012  | LaCous ........................ 713/186 |

(Continued)

FOREIGN PATENT DOCUMENTS

| JP | 2003150379 | 5/2003  |
| JP | 2003280915 | 10/2003 |

(Continued)

OTHER PUBLICATIONS

Bottomley et al., "Making UEFI Secure Boot Work With Open Platforms", The Linux Foundation, http://www.linuxfoundation.org, Oct. 2011.

(Continued)

*Primary Examiner* — Thomas Lee
*Assistant Examiner* — Santosh R Poudel
(74) *Attorney, Agent, or Firm* — Kunzler Law Group

(57) ABSTRACT

Provided is a method for temporarily skipping a secure boot function. A computer is configured so that a secure boot function is set as enabled by default. Depression of a power button of the computer in a power-off state generates a startup signal. At the time of startup from S4/S5 state, a switch is turned ON and PP bit indicating physical presence is set at a register. Depression of a specific key on a keyboard causes DE bit to be set at a register. When PP bit and DE bit are found, UEFI firmware stored in a firmware ROM temporarily skips integrity validation of a boot program only for boot this time.

20 Claims, 5 Drawing Sheets

(56) References Cited

U.S. PATENT DOCUMENTS

| | | | |
|---|---|---|---|
| 8,250,387 B2* | 8/2012 | Tsukamoto et al. | 713/300 |
| 8,555,082 B1* | 10/2013 | Bibikar et al. | G09C 1/00 713/189 |
| 2005/0044348 A1* | 2/2005 | O'Connell | 713/1 |
| 2005/0108557 A1* | 5/2005 | Kayo et al. | 713/189 |
| 2005/0125407 A1* | 6/2005 | Kraus et al. | 707/8 |
| 2005/0154886 A1* | 7/2005 | Birk et al. | 713/168 |
| 2005/0273588 A1* | 12/2005 | Ong et al. | 713/2 |
| 2006/0155988 A1* | 7/2006 | Hunter et al. | 713/164 |
| 2006/0161769 A1* | 7/2006 | Hunter et al. | 713/164 |
| 2006/0161784 A1* | 7/2006 | Hunter et al. | 713/182 |
| 2006/0161790 A1* | 7/2006 | Hunter et al. | 713/189 |
| 2007/0061587 A1* | 3/2007 | Kim | 713/182 |
| 2007/0079112 A1* | 4/2007 | Lewis et al. | 713/2 |
| 2008/0082809 A1* | 4/2008 | Rothman et al. | 713/1 |
| 2008/0300774 A1* | 12/2008 | Wakahara | 701/113 |
| 2009/0044001 A1* | 2/2009 | Thomas | 713/2 |
| 2009/0327741 A1* | 12/2009 | Zimmer et al. | 713/183 |
| 2010/0011439 A1* | 1/2010 | Takiyama | 726/19 |
| 2010/0017659 A1* | 1/2010 | Dos Remedios | 714/36 |
| 2010/0042824 A1* | 2/2010 | Lee et al. | G06F 21/6218 713/2 |
| 2010/0083365 A1* | 4/2010 | Gurumoorthy et al. | 726/16 |
| 2010/0153752 A1* | 6/2010 | Tsukamoto et al. | 713/300 |
| 2010/0169631 A1* | 7/2010 | Yao et al. | 713/2 |
| 2011/0099627 A1* | 4/2011 | Proudler | G06F 21/57 726/21 |
| 2011/0113181 A1* | 5/2011 | Piwonka et al. | G06F 8/65 711/102 |
| 2012/0096450 A1* | 4/2012 | Schaefer et al. | 717/168 |
| 2012/0135810 A1* | 5/2012 | Ohsawa et al. | 463/43 |
| 2012/0159652 A1* | 6/2012 | Gurumoorthy et al. | 726/34 |
| 2012/0191960 A1* | 7/2012 | Piwonka et al. | G06F 9/441 713/2 |
| 2012/0311314 A1* | 12/2012 | Cumming et al. | 713/2 |

FOREIGN PATENT DOCUMENTS

| | | |
|---|---|---|
| JP | 2008537224 | 9/2008 |
| JP | 2009013831 A1 | 1/2009 |
| JP | 201046048 | 1/2010 |
| WO | 2006113167 A2 | 10/2006 |

OTHER PUBLICATIONS

Sinofsky, "Protecting the pre-OS environment with UEFI", Sep. 23, 2011.

* cited by examiner

ALLOWING BYPASSING OF BOOT VALIDATION IN A COMPUTER SYSTEM HAVING SECURE BOOT ENABLED BY DEFAULT ONLY UNDER CERTAIN CIRCUMSTANCES

CROSS-REFERENCE TO RELATED APPLICATIONS

This application is a national patent application and claims priority to Japanese Patent Application Number 2012-009980 entitled "METHOD FOR BOOTING COMPUTER AND COMPUTER" and filed on 20 Jan. 2012 for Ken Sasaki, et al., which is incorporated herein by reference.

FIELD

The invention relates to a technique of controlling a secure boot function to validate integrity of a boot program and more particularly relates to a technique of limiting a secure boot function with a simple operation while suppressing the lowering of a security level.

BACKGROUND

Firmware is code that provides an interface between hardware and an upstream program such as an operating system (OS), a device driver or an application program. The firmware can be classified into device firmware, which is dedicated to control a peripheral device, and system firmware, which relates to the operation of a system as a whole (also called platform firmware).

The system firmware is stored in a non-volatile memory (NVRAM) that is typically attached to a motherboard. The most well-known system firmware is the BIOS, which performs a Power-On Self-Test (POST) and processes a password or provides a service to access hardware after activating a power supply of a computer and before starting of load of the OS. The BIOS supports a 16-bit processor and a 1 MB memory space, and it is becoming difficult for the BIOS to deal with recent advancements in hardware.

Under such a circumstance, as shown in Non Patent Document 1, the UEFI (Unified Extensible Firmware Interface) forum developed the specifications on a new system firmware (hereinafter called UEFI firmware) to be used instead of the BIOS or in addition to the BIOS. In a system equipped with the UEFI firmware, only an OS and a device driver supporting the UEFI can run. In most cases, however, the UEFI firmware is provided to emulate the BIOS, and therefore both of a UEFI supported OS and a UEFI not-supported OS supporting only the BIOS can run in the system equipped with the UEFI firmware.

Meanwhile, a startup disk stores a program called a boot loader to load the OS. At the time of startup, the UEFI firmware firstly performs a handoff to the boot loader to pass the control. The boot loader requests the UEFI firmware to load a main memory of the OS image. If the boot loader is attacked and falsified by malware, an anti-malware program will not be loaded or, alternatively, malware embedded in the disk drive will be loaded. Therefore a countermeasure to protect the boot loader is required.

Patent Document 1 discloses the invention to protect a computer against malware attacking a boot loader. Further, as shown in Non Patent Document 2 and Non Patent Document 3, the UEFI specifications define secure boot in section 27.5. The secure boot is a technique to improve the security of a computer by permitting the execution of only a code or a boot loader that is validated for maintained integrity. Patent Document 2 discloses, as another technique of improving the security of a computer, physical presence to validate that a user physically possessing a platform is operating the platform. Patent Document 3 discloses the invention to start up a system while changing a startup device without a troublesome operation by entering a specific key at the time of activation of the power supply. Patent Document 4 discloses the invention to starting up an OS corresponding to the ID of the hot key and depressing a hot key immediately after turning the power on.

Patent Document 1—Published Japanese Translation of PCT application No. 2008-537224.

Patent Document 2—Japanese Patent Application Publication No. 2010-146048.

Patent Document 3—Japanese Patent Application Publication No. 2003-280915.

Patent Document 4—Japanese Patent Application Publication No. 2003-280915.

Non Patent Document 1—Unified Extensible Firmware Interface Specification, Version 2.3.1, Sep. 7, 2011, Internet search on Dec. 19, 2011, http://www.uefi.org/specs/download/?item_key=aea8a9a9173c42dc477aea293160b62816049d9a.

Non Patent Document 2—Making UEFI Secure Boot work with Open Platforms, October 2011, James Bottomley, Jonathan Corbet, The Linux Foundation, Internet search on Dec. 19, 2011, http://www.linuxfoundation.jp/publications/making-uefi-secure-boot-work-with-open-platforms.

Non Patent Document 3—Protecting the pre-OS environment with UEFI, Steven Sinofsky, Sep. 27, 2011, Internet search on Dec. 19, 2011, http://blogs.msdn.com/b/b8_ja/archive/2011/09/27/uefi-os.aspx.

SUMMARY

A UEFI-supported operating system (OS) can run without the validation of integrity. In order to secure the safety of a system equipped with UEFI firmware, however, it is desirable to set the secure boot function as enabled by default to make sure to validate the integrity of the OS before booting. On the other hand, since the UEFI firmware has compatibility with the BIOS, a user may wish to run an OS that does not support UEFI in a system equipped with the UEFI firmware. For instance, there may be a case where a UEFI supported OS is stored in a disk drive and an OS not supporting UEFI is stored in another disk drive so that the user can select one of the OSs for booting.

In this case, when the secure boot function is set as enabled, the UEFI firmware cannot validate the integrity of the OS not supporting UEFI successfully, resulting in a failure in booting of such an OS. Therefore, in order to boot the OS not supporting UEFI, the secure boot function set by default has to be changed as disabled. The secure boot function is set through a set-up menu that the UEFI firmware provides. Once the secure boot function is set as enabled, the UEFI firmware validates the integrity for each boot. Only when the validation succeeds does the UEFI firmware allow the OS to boot.

To set the secure boot function as disabled requires a user to perform troublesome procedures, including entering a set-up menu, changing the settings, and typically rebooting the system, thus lengthening the boot time. Further, since the secure boot function is desirably set as enabled in a system equipped with the UEFI firmware, the system has to restart after the execution of an OS not supporting UEFI to enter a set-up menu and return the setting of the secure boot function to enabled, thus further requiring a user to perform troublesome procedures. If a user does not set the secure boot function as enabled, a UEFI supported OS may be booted without validation of the integrity, thus impairing the security policy to set the secure boot function as enabled by default.

Therefore, it is an object of the present invention to provide a method of temporarily loading a boot program without the validation of integrity in a computer configured to validate the integrity of a boot program by default. It is another object of the present invention to provide a method of loading a boot program without validation of integrity with a simple operation. It is still another object of the present invention to provide a method of loading a boot program without validation of integrity while reducing security risk. It is a further object of the present invention to provide a method of loading a boot program without validation of integrity in a short time. It is still a further object of the present invention to provide a computer and a computer program that implement such methods.

A computer according to the present invention is configured so that a secure boot function is set as enabled by default, the secure boot function being for validation of the integrity of a boot program. Setting the validation of integrity as enabled by default means that, unless a user sets it as disabled by explicitly indicating such an intention, the computer must execute the routine to validate the integrity of a boot program to be loaded. Setting as enabled by default further means that the disabled state will be changed to an enabled state in the next boot without intervening a user's operation. The integrity may be called consistency, compatibility or the like, meaning that the boot program has not been rewritten in an unauthorized manner from the time when the boot program is installed in a computer.

The boot program may be a large scale OS, such as Windows®, or a small scale program, such as an update program of system firmware. The boot program is stored in any boot device such as a disk drive, an external USB memory, or an embedded non-volatile memory. The boot program may exist in a storage device that is connected to the computer via a network. Validation of integrity can be performed in a Public Key Infrastructure (PKI) method, targeted for a boot loader or a boot image of the boot program. The boot program may be a program supporting the secure boot function or a program not supporting the secure boot function.

A boot program supporting the secure boot function can be loaded without validation of integrity thereof. The present invention, however, makes sure to validate the integrity of a boot program supporting the secure boot function unless the secure boot function is temporarily stopped by explicit intention of the user. In the present invention, only when a boot program not supporting the secure boot function is to be loaded, the secure boot function is temporarily stopped before loading. When execution of such a boot program ends, the environment is returned so as to enable the secure boot function in a simple and secure manner and in a short time.

In one embodiment of the present invention, a power supply of a computer is firstly activated in response to a startup signal. The computer generates a first signal indicating physical presence when the startup signal is generated in accordance with an operation by a user who physically accesses the computer in a power-off state. The first signal may be a PP signal. The computer may generate a second signal indicating temporal stop of the secure boot function in accordance with an operation by the user at startup this time. The second signal may be a DE signal. When the first signal and the second signal are generated, the computer skips validation of integrity only for boot, this time to load the boot program.

The first signal is generated in accordance with an operation by a user physically present in front of the computer, and the second signal is generated in accordance with an operation by the user at startup this time. Only when the first signal and the second signal are generated is the computer able to skip validation of integrity to load a boot program, and accordingly the boot program can be loaded with a simple operation while reducing security risk.

Once the secure boot function is set as disabled through a set-up menu, the disabled state is kept unless the setting is changed again to enable. In contrast, in the present invention, since the second signal is generated in accordance with an operation by the user in every startup, validation of integrity will not be skipped again in the next startup. Validation of integrity is skipped only when a predetermined condition involving indication of user's intention holds at a time, and integrity will be validated in the next startup as well in accordance with the default setting unless the second signal is generated, thus allowing enable setting by default to be maintained.

In order to complete boot in a short time, it is desirable to load a boot program while skipping validation of integrity without rebooting the system. In the case of a computer having a password set therefor, only when the password is authenticated successfully, can the load be performed while skipping validation of integrity. In this case, a person other than the computer's owner who manages the password is not allowed to set the secure boot function as disabled, so that the security can be secured against such unauthorized action.

When the first signal and the second signal or any one of these signals is not generated, a boot program can be loaded after validation of integrity thereof as default setting. When validation of integrity fails, another boot device storing a boot program may be selected, and the boot program stored may be loaded after validation of integrity thereof. In that case, as long as the computer supports the secure boot function and there is a boot device storing a not-falsified boot program, the boot program can be booted automatically after validation of integrity in accordance with the priority order of boot devices.

In the case of a computer equipped with the secure boot function, a boot program supporting the secure boot function is typically loaded, and a boot program not supporting the secure boot function is often loaded from various types of boot devices. In that case, a boot device selection screen displayed facilitates the selection by a user of a boot device before loading of a boot program not supporting the secure boot function while skipping validation of integrity thereof. The second signal may be generated in response to depression of a key on a keyboard. In response to validation of a first finger by a fingerprint authentication device, the startup signal and the first signal may be generated, and in response to validation of a second finger by the fingerprint authentication device, the startup signal, the PP signal and the DE signal may be generated. In this case, the secure boot function may be easily set as default setting or may be skipped only for boot this time just by changing a finger to be authenticated.

The present invention can provide a method of temporarily loading a boot program without the validation of integrity in a computer configured to validate the integrity of a boot program by default. The present invention further can provide a method of loading a boot program without validation of integrity with a simple operation. The present invention still further provides a method of loading a boot program without validation of integrity while reducing security risk. The present invention further can provide a method of loading a boot program without validation of integrity in a short time.

The present invention still further can provide a computer and a computer program that implement such methods.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Overall Hardware Configuration

Figure 1:
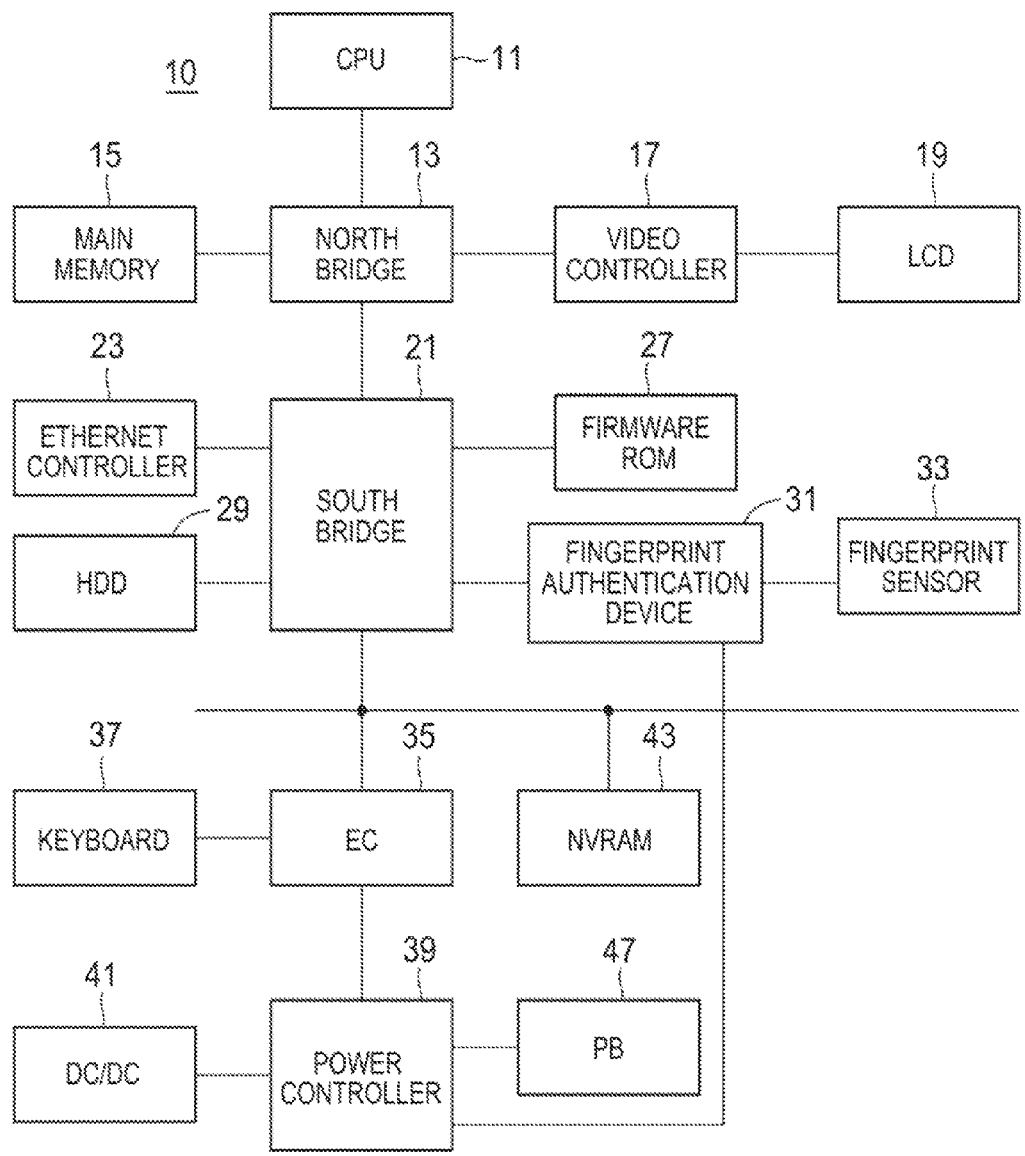
FIG. 1 is a schematic block diagram illustrating the configuration of main hardware components of a laptop PC.

FIG. 1 is a functional block diagram illustrating the configuration of main hardware components of a notebook-sized personal computer (laptop PC) 10. Since the configuration of many hardware components is well known, the following describes the necessary parts of the present invention. A north bridge 13 is connected to a CPU 11, a main memory 15, a video controller 17 and a south bridge 21. The video controller 17 is connected to an LCD 19. The south bridge 21 is provided with interface functions of various standards, and FIG. 1 illustrates the typical case where PCI Express is connected to an Ethernet® controller 23, SATA is connected to a hard disk drive (HDD) 29, SPI is connected to a firmware ROM 27, USB is connected to a fingerprint authentication device 31, and LPC is connected to an embedded controller (EC) 35 and an NVRAM 43.

The south bridge 21 includes an RTC memory that sets a resume time at a RTC (Real Time Clock) and stores configuration information of UEFI firmware. The RTC memory receives supply of electric power from an RTC coin battery when all of the power supplies for the laptop PC 10 are stopped. The Ethernet® controller 23 is an expansion card to connect to a wired LAN of the Ethernet® standard, and is connected to a connector of RJ45 standard attached to the casing of the laptop PC 10. In a predetermined power state (S3 or S4/S5), the laptop PC 10 is able to start up in a so-called Wake On LAN (WOL) manner by receiving a magic packet from a network via the Ethernet® controller 23.

The HDD 29 is attached to a device bay of the laptop PC 10, so as to allow a user to replace it. The HDD 29 is a boot device that stores a boot image. The UEFI firmware is configured to boot a UEFI supported OS from the HDD 29. The HDD 29 may have different partitions and may store a different boot image at each partition. At this time, one partition may store a boot image of the UEFI supported OS, and another partition may store a boot image of an OS not supporting UEFI. Then, a HDD storing the OS not supporting UEFI may be mounted to the device bay for booting.

Any HDD stores a boot loader to load a boot image of an OS. A boot loader to load a UEFI supported OS includes an electronic signature assigned thereto, the electronic signature being created by encrypting a hash (gesture) of the boot loader with a private key of the creator, the hash being calculated when the OS is stored in the HDD 29 mounted to the laptop PC 10. The secure boot function specified by the UEFI can be implemented by UEFI firmware 100 before loading of the OS to validate the integrity of the boot loader using the PKI method and the electronic signature. Validation of integrity may be targeted for the actual loaded boot image as a whole. A public key created as a pair of the private key is stored in the firmware ROM 27.

When a boot loader completely holds the identity at the time when an OS is first stored in the HDD 29, as well as at the following booting, such a boot loader can be said to have integrity. Note that a boot loader to load a OS not supporting UEFI does not include an electronic signature assigned thereto for validation with the secure boot function. The laptop PC 10 further allows boot from other boot devices such as a USB memory, a secondary HDD or a NVRAM that stores a boot image of a UEFI supported OS or a OS not supporting UEFI.

The fingerprint authentication device 31 is connected to a swipe type fingerprint sensor 33 to generate a fingerprint image of a user. Even when the laptop PC 10 is in a power-off state, the fingerprint authentication device 31 can compare a swiped finger with a template registered beforehand for authentication. The fingerprint authentication device 31 is connected to a power controller 39, and when the fingerprint authentication succeeds, the fingerprint authentication device 31 can output a startup signal to the power controller 39. The main fingerprint authentication device 31 further can output a different startup signal depending on a finger to be authenticated.

The fingerprint authentication device 31 is physically integrally attached to the casing of the laptop PC 10. Since physical presence is defined in accordance with the specifications of the Trusted Computing Group (TCG), only a user that operates the computer in front of the computer and activates the power supply from the S4/S5 state (described later) is allowed to make an assertion to the computer. When the fingerprint authentication device 31 is used as a startup device, the startup matches the requirements of physical presence defined by the specifications of the TCG.

The EC 35 is a micro-computer made up of a CPU, a ROM, a RAM and the like. The EC 35 can execute a program to manage the internal operating environment of the laptop PC 10 independently of the CPU 11. The EC 35 includes a keyboard controller, and is connected to a keyboard 37 and the power controller 39. In accordance with an instruction from the south bridge 21, the EC 35 controls the power controller 39 to let the power state of the laptop PC 10 transition.

The power controller 39 is a wired logic digital control circuit (ASIC) that controls a DC/DC converter 41. The power controller 39 is connected to the DC/DC converter 41. The DC/DC converter 41 converts a DC voltage supplied from an AC/DC adapter or a battery pack (not illustrated) into a plurality of voltages necessary to operate the laptop PC 10, and further supplies electric power to each device on the basis of electric power supply classes defined corresponding to the power states. The power controller 39 is connected to a power button 47 to start up the laptop PC 10.

The power button 47 is attached to the casing of the laptop PC 10 so as to be physically integrally coupled therewith, and only a user who physically possesses the laptop PC 10 is allowed to depress the button. In order to allow a user to depress the power button 47 to activate the power supply, the startup method matches the requirements of the physical presence defined by the specifications of the TCG. When the power button 47 is depressed, a startup signal is output to the power controller 39. When the power button 47 of the computer is depressed in the S3 state, S4 state or S5 state, the power controller 39 controls the DC/DC converter 41 to supply electric power to each device for transition to S0 state.

The secure NVRAM 43 is a non-volatile memory having secured security against falsification and wiretapping. The laptop PC 10 supports a power saving function of Advanced Configuration and Power Interface (ACPI) and Plug and Play. The ACPI defines four sleeping states from S1 state to S4 state between the power-on state (S0 state) showing the maximum power consumption and a power-off state (S5 state) showing the minimum power consumption, and the laptop PC 10 defines S3 state and S4 state.

S3 state is a so-called suspend state, also called suspend-to-RAM, where system context is stored in the main memory 15 and disappears from the device. In S3 state, electric power is supplied to the main memory 15 and the north bridge 13 that are necessary to maintain the stored content of the main memory 15, and to the south bridge 21, the EC 35 and the Ethernet® controller 23 that are necessary to execute WOL. In S3 state, electric power is supplied to a device required for activation of the power supply such as the power controller 39 as well. In S3 state, power supply to other devices is stopped. The range of the devices receiving electric power in S3 state is one example.

S4 state is a so-called suspend-to-disk, also called a hibernation state, where system context and data in the main memory 15 are stored in the HDD 29. In S4 state, power supply to devices other than a minimum required device for activation of the power supply such as the power controller 39 is turned off. S5 state is a so-called soft off, and is the same as S4 state in the range of devices receiving electric power expect that an OS does not store the context in the HDD 29. Herein, different ranges of devices receiving electric power may be set for S4 state and S5 state between the battery pack and the AC/DC adapter used as the power supply source of the laptop PC 10. In S0 state, electric power is supplied to all devices other than a device set as disabled.

Data Configuration of Firmware ROM

Figure 2:
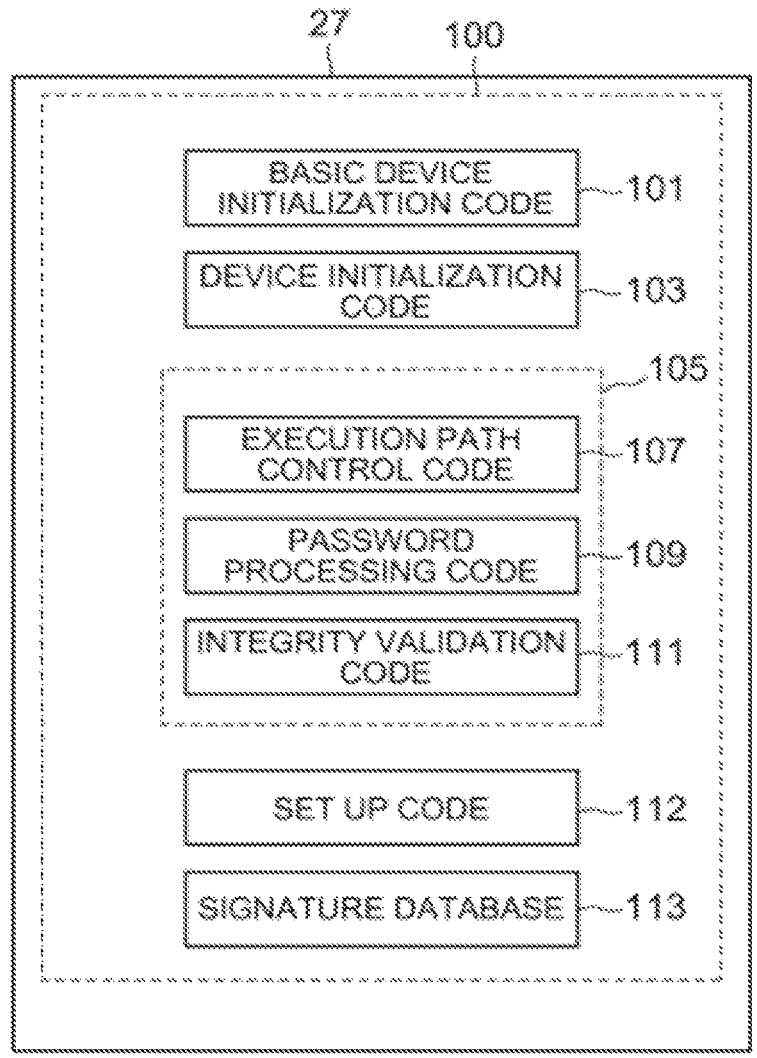
FIG. 2 illustrates the data configuration of a firmware ROM.
Figure 3:
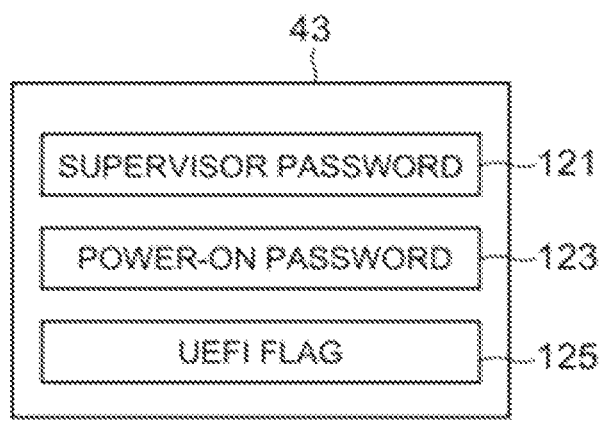
FIG. 3 illustrates the data configuration of a NVRAM.

FIG. 2 illustrates the data configuration of the firmware ROM 27. FIG. 3 illustrates the data configuration of the NVRAM 43. The firmware ROM 27 is a non-volatile memory in which stored content can be electrically rewritten, storing a UEFI firmware 100 made up of a plurality of code groups. The NVRAM 43 stores a supervisor password 121 and a power-on password 123 that are set by a user and a UEFI flag 125.

The UEFI firmware 100 is able to configure the supervisor password 121, the power-on password 123 and a HDD password. The supervisor password 121 is requested to enter a set-up menu to change the setting of the UEFI firmware 100, and the power-on password 123 is requested to boot the laptop PC 10. The HDD password is requested to make an access to the HDD 29. The HDD password is stored in a system region of a disk of the HDD 29.

The UEFI firmware 100 makes up system firmware of the laptop PC 10. The UEFI firmware 100 adopts a boot block method to reduce risk involved in rewriting. The firmware ROM 27 as a whole is configured as a boot block, and a code stored there which is specified in the specification of the Trust Platform Module (TPM) as Core Root of Trust Measurement (CRTM) cannot be rewritten without the specific authorization. The CRTM is configured as a part whose integrity is assured in the initialization code of the platform, and at the time of reset of the platform, the CRTM has to be executed first. The CRTM is first executed when the laptop PC 10 transitions from S4 state or S5 state (hereinafter called S4/S5 state) to S0 state.

A basic device initialization code 101 detects, examines and initializes, to the necessary extent, basic devices such as the CPU 11 and the main memory 15 that are necessary to load the firmware 100 in the main memory 15 for execution when the laptop PC 10 starts up and transitions from S3 state or S4/S5 state to S0 state. A device initialization code 103 initializes most of the devices such as a controller of the south bridge 21 and peripheral devices after the supply of a reset signal to the CPU 11 and before the load of an OS. A boot manager 105 initializes a device necessary to load the OS, manages the order of boot, and deals with secure boot.

When a predetermined function key of the keyboard 37 is depressed during the execution of the boot manager 105, a set up code 112 displays a set-up screen on the LCD 19. A user is allowed to, through the set-up screen, decide the priority order of boot devices, configure a startup method, configure devices used, configure power management, and the like.

The set up code 112 stores the configured information in a volatile RTC memory having a power supply supported with a RTC coin battery in the south bridge 21. A user is allowed to, through the set-up screen, set the UEFI flag 125 to set the secure boot function as enabled or set a password. Once the UEFI flag 125 is set, the secure boot function will be implemented unless a special operation according to the present embodiment is performed at the time of boot.

The passwords that a user sets through the set-up screen include the supervisor password 121, the power-on password 123, and the HDD password. When the supervisor password 121 is set, the set-up screen cannot be displayed without inputting the supervisor password 121, and therefore the UEFI flag 125 also cannot be canceled.

An execution path control code 107 controls an execution path of the firmware 100 so as to set the secure boot function as enabled by default by maintaining the setting of the UEFI flag 125 while temporarily skipping the secure boot function only when a user has an explicit intention as such. The execution path control code 107 refers to the UEFI flag 125 set at the NVRAM 43 and registers 211, 213 (see FIG. 4) of the power controller 39 to decide whether or not to perform a handoff after the execution of an integrity validation code 111 or to perform a handoff without executing the integrity validation code 111.

When the UEFI flag 125 is not set at the NVRAM 43 or when the UEFI flag 125 is set and PP bit and DE bit are set at the registers 211 and 213 of the power controller 39, the execution path control code 107 does not pass an execution path to the integrity validation code 111 but reads out a boot loader stored in a boot device to the main memory 15 to shift the control thereto. When the UEFI flag 125 is set and PP bit or DE bit is not set, the execution path control code 107 passes an execution path to the integrity validation code 111.

When the supervisor password 121 is set, a password processing code 109 displays a prompt requesting the input of the supervisor password 121 before displaying a set-up screen in response to calling by a user of the set-up screen. When the supervisor password 121 is set and the secure boot function is to be temporarily skipped, the password processing code 109 displays a prompt requesting the input of the supervisor password 121. When the power-on password 123 or the HDD password is set, the password processing code 109 displays a prompt on the LCD 19 on the way of the execution of the boot manager 105 to request the input of the password from a user. When authentication of the password succeeds, the password processing code 109 allows a subsequent routine and when the authentication fails, the password processing code 109 stops the boot at that time.

The integrity validation code 111 reads out a boot loader from the main memory 15 for validation of the integrity immediately before control is shifted from the UEFI code 100 to the OS. A UEFI supported boot loader includes an electronic signature assigned thereto, the electronic signature being obtained by encrypting a hash calculated by a creator creating the electronic signature with a private key. A signature database 113 stores the ID of the boot loader and a public key as a pair of the private key used for the electronic signature. The integrity validation code 111 compares a hash calculated from a code of the boot loader and a hash of the electronic signature obtained by decrypting with the public key obtained from the signature database 113. When they agree, the signature database 113 determines that the integrity is maintained and allows the execution of the boot loader. As for a UEFI-supported OS, if the OS is not falsified from the state stored in the HDD 29, the validation will succeed.

Hardware Configuration to Control Secure Boot Function

Figure 4:
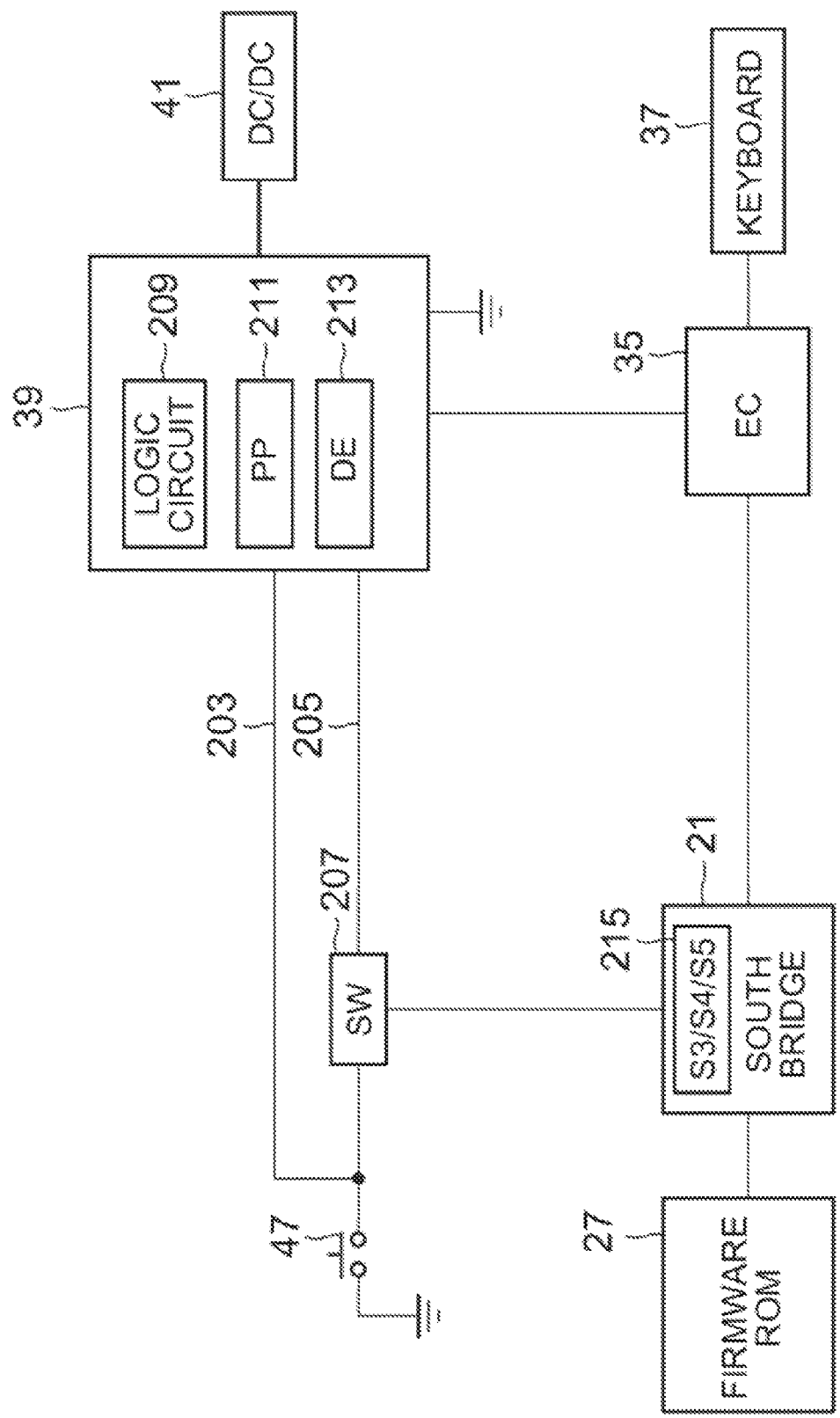
FIG. 4 is a functional block diagram illustrating the configuration of hardware to control the secure boot function specified by the UEFI.

FIG. 4 is a functional block diagram illustrating the configuration of hardware to control the secure boot function. The south bridge 21 includes a register 215 made up of a non-volatile memory to set the current power state. The power controller 39 includes a logic circuit 209, the register 211 to set PP bit when the physical presence is acknowledged and the register 213 to set DE bit to indicate a user's intention of stopping the secure boot function at boot this time.

In order to set the UEFI flag 125 to enable the secure boot function by default while temporarily skipping the secure boot function only at boot this time, the PP bit and the DE bit set at boot this time have to be securely cleared before the next boot. Since the power controller 39 is a minimum required circuit to activate the power supply of the laptop PC 10, electric power is supplied thereto even in S4/S5 state. Meanwhile, electric power can be supplied to the registers 211 and 213 from a power supply in a different system, and such a power supply may be stopped in S4/S5 state to clear the registers. As another configuration, the electric power of the registers 211 and 213 may be maintained in S4/S5 state, and it may be cleared before the execution path control code 107 performs a handoff to the OS. The registers 211 and 213 may be provided at another device such as the EC 35 or the NVRAM 43.

The power button 47 is connected to the power controller 39 via a startup signal line 203. The power button 47 is further connected to one of the terminals of a switch 207, and the other terminal of the switch 207 is connected to the power controller 39 via a PP bit setting line 205. The switch 207 has a control terminal that is connected to the south bridge 21. When the computer transitions from S0 state to S3 state or S4/S5 state, the OS sets S3 bit or S4/S5 bit at the register 215. The S4/S5 bit set at the register 215 indicates that the current power state is S4/S5 state.

When S4/S5 bit is set at the register 215, the south bridge 21 controls the switch 207 ON, and when S3 bit is set there or the register is cleared, the south bridge 21 controls the switch 207 OFF. When a user depresses the power button 47, a startup signal is output to the power controller 39 via the startup signal line 203. When S4/S5 bit is set at the register 215, a startup signal is output to the power controller 39 via the PP bit setting line 205.

Receiving a startup signal via the startup signal line 203, the logic circuit 209 controls the DC/DC converter 41 to supply electric power to all devices and let the power supply transition to S0 state. Receiving a startup signal via the PP bit setting line 205, the logic circuit 209 sets PP bit at the register 211. When a single key specially allocated on the keyboard 37 is depressed or when a plurality of keys specially allocated is depressed at the same time, the EC 35 sets DE bit at the register 213.

Method for Controlling Secure Boot Function

Figure 5:
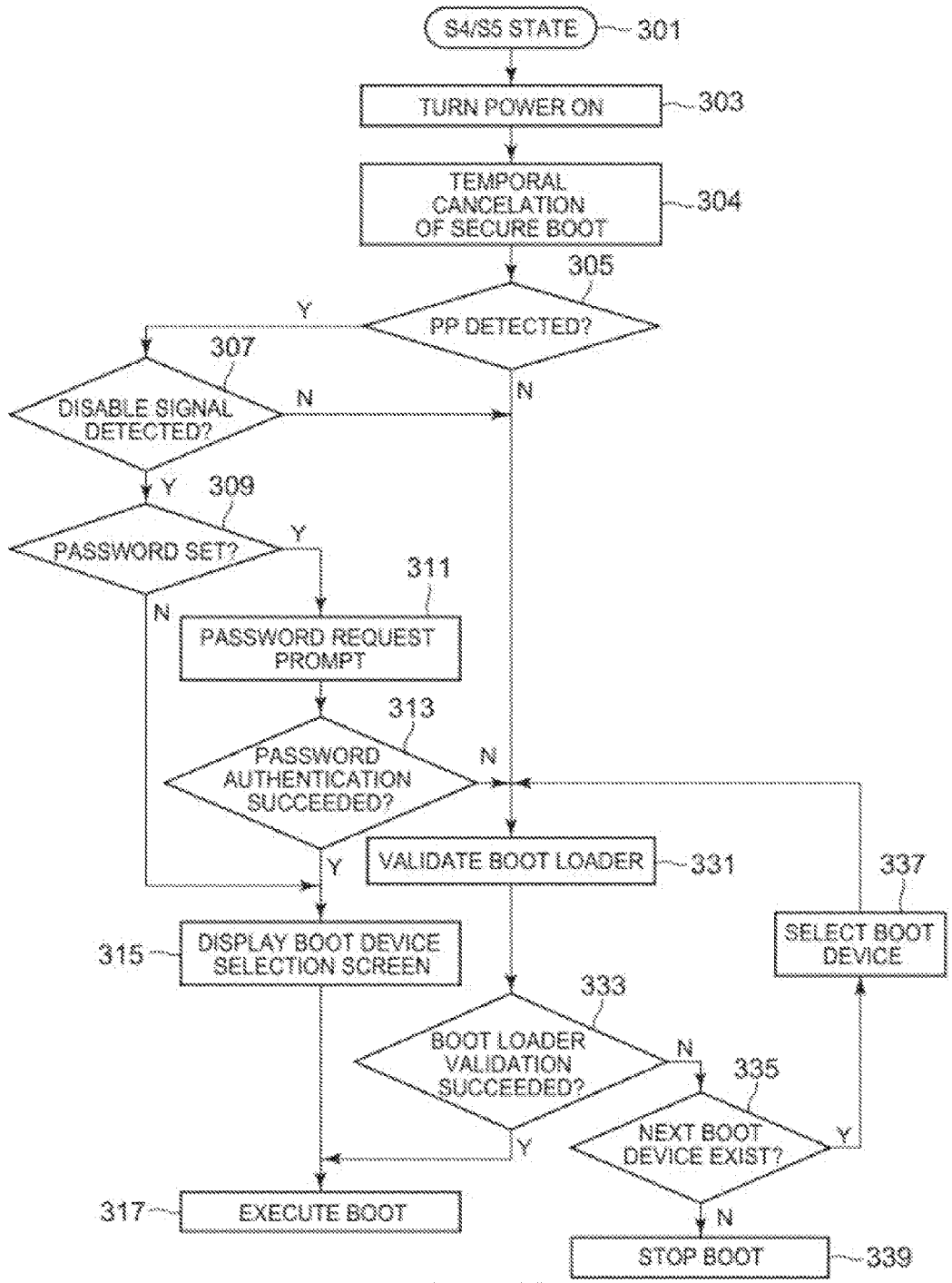
FIG. 5 is a flowchart illustrating the procedure to control the secure boot function.

Referring next to the flowchart of FIG. 5, the following describes a method of temporarily cancelling the secure boot function in the laptop PC 10. At block 301 of FIG. 5, the laptop PC 10 transitions to be in S4/S5 state. The OS sets S4/S5 flag at the register 215 when the system transitions to the power-on state at the boot last time and before the system transitions to S4/S5 state. Even in S4/S5 state, electric power is supplied to minimum required circuits such as the power controller 39 and the power button 47 necessary to activate the power supply.

Since the laptop PC 10 transitions to be in S4/S5 state, the registers 211 and 213 are cleared. At the NVRAM 43, the supervisor password 121 and the UEFI flag 125 are set. A user set the order of HDD 29 to the top priority in some devices boot order through a set-up screen. The HDD 29 stores a UEFI supported OS at one partition and stores a OS not supporting UEFI at another partition.

At block 303, depression of the power button 47 or Wake On LAN (WOL) activates the power supply of the laptop PC 10. When the power button 47 is depressed, a startup signal is sent to the power controller 39 via the startup signal line 203. Detecting the startup signal, the logic circuit 209 controls the DC/DC converter 41 to supply electric power to all devices operating in S0 state.

Receiving electric power, the south bridge 21 refers to the register 215 to confirm that S4/S5 flag is set and turns the switch 207 ON. Since the time required for such processing is very short and the power button 47 is depressed at the time of turning the switch 207 ON, a startup signal is sent to the power controller 39 via the PP bit setting line 205. Receiving the startup signal, the logic circuit 209 sets PP bit at the register 211.

In S4 state, the laptop PC 10 can activate the power supply by WOL as well. In the case of the activation by WOL, the south bridge 21, receiving a magic packet through the Ethernet® controller 23, instructs the EC 35 to activate the power supply. In this case, since the power controller 39 does not receive a startup signal via the PP bit setting line 205, PP bit is not set at the register 211. When the current power state is S3 state at block 301, the switch 207 is OFF. Therefore, even when the power button 47 is depressed, the power controller 39 does not receive a startup signal via the PP bit setting line 205 and so does not set PP bit at the register 211.

Being powered on, the CPU 11 performs power-on-reset, and reads out the basic device initialization code 101 to a cache for execution. The basic device initialization code 101 detects, examines and initializes basic devices such as the main memory 15 and the north bridge 13 that are necessary to execute the firmware 100. When the main memory 15 becomes available, the CPU 11 loads the remaining UEFI code 100 to the main memory 15 and makes the device initialization code 103 initialize most of the devices such as peripheral devices.

Subsequently, the CPU 11 executes the boot manager 105. At block 304, during execution of the boot manager 105, the user depresses a specific function key at an appropriate timing when the input from the keyboard 37 is allowed so as to indicate a user's intention to temporarily skip the secure boot function at boot this time. Receiving a signal corresponding to the specific function key from the EC 35, the logic circuit 209 sets DE bit at the register 213. Unless the user depresses the predetermined function key during a predetermined time after startup to call the set up code 112, the boot routine of the UEFI firmware 100 keeps proceeding.

At block 305, the control is shifted to the execution path control code 107 in the boot manager 105. The execution path control code 107 refers to the register 211 to check whether PP bit is set or not. When PP bit is set, the procedure proceeds to block 307. When PP bit is not set, the procedure proceeds to block 331 to shift the control to the integrity validation code 111. The shift to block 331 corresponds to the case where startup by WOL is performed from S4 state or S5 state and the laptop PC 10 does not acknowledge physical presence. At block 307, the execution path control code 107 refers to the register 213 to check whether DE bit is set or not.

When DE bit is set, the procedure proceeds to block 309. When DE bit is not set, the procedure proceeds to block 331. At block 309, the execution path control code 107 determines whether the supervisor password 121 is set or not. When the supervisor password 121 is set, the procedure proceeds to block 311 to shift the control to the password processing code 109. When the supervisor password 121 is not set, the procedure proceeds to block 315 to shift the control to the set up code 112. At block 311, the password processing code 109 automatically displays, on the LCD 19, a prompt requesting the input of the supervisor password 121.

At block 313, the password processing code 109 authenticates the supervisor password 121 input by the user. When the authentication of the supervisor password 121 succeeds, the procedure proceeds to block 315 to shift the control to the set up code 112. When the authentication fails, the procedure proceeds to block 331 to shift the control to the integrity validation code 111. Herein, boot for a UEFI supported OS is desirably performed after authentication of the integrity. At block 304, a user indicates their intention to temporarily skip the secure boot function when boot is to be performed for an OS not supporting UEFI stored at another partition of the HDD 29 or for an OS not supporting UEFI or executable program stored in a USB memory, an auxiliary HDD or a NVRAM.

At block 315, the set up code 112 automatically displays a boot device selection screen. The user selects a boot device from the boot device selection screen to complete the selection of a boot device, and then the UEFI firmware 100 performs a handoff and the procedure proceeds to block 317. At block 317, the UEFI firmware 100 skips validation of integrity of the boot loader to load the OS. The UEFI firmware 100 emulates the BIOS to process a service request from an OS not supporting UEFI.

At blocks 331 and 333, the integrity validation code 111 reads out a boot loader of a UEFI supported OS in the HDD 29 set as a boot device to the main memory 15. A UEFI supported OS means that the boot loader therefor includes an electronic signature attached thereto. The integrity validation code 111 acquires a public key corresponding to the boot loader read out from the signature database 113 and decrypts the electronic signature attached to the boot loader. The integrity validation code 111 further calculates a hash from the code of the boot loader and compares the hash with the decrypted electronic signature.

If the hash obtained by decryption of the electronic signature and the hash calculated from the read out boot loader agree, the boot loader is not falsified after storage in the HDD 29, so that validation of the integrity succeeds. If the validation shows a falsified boot loader or a boot loader to boot an OS not supporting UEFI, then the authentication fails. When a boot device stores a boot image of a relatively small executable program, electronic authentication targeted for the boot image as a whole may be attached, and the integrity thereof may be validated by the PKI method in a similar manner.

When the validation succeeds, the procedure proceeds to block 317. When the validation fails, the procedure proceeds to block 335 to shift the control to the execution path control code 107. At block 335, the execution path control code 107 determines whether the next boot device exists or not. When the boot device exists, the procedure proceeds to block 337, where the execution path control code 107 sets a startup flag at the boot device set at the next order in the HDD 29 and the procedure returns to block 331.

When the next boot device does not exist, the procedure proceeds to block 339, where the execution path control code 107 does not pass control to the next boot routine but stops the boot. In order to perform boot successfully at the next startup, the user may mount a boot device storing a UEFI supported OS so as to let the boot via the path at block 331 or sets PP bit or DE bit so as to let the boot via the path at block 315.

At block 317, when the boot succeeds and the system transitions to S4/S5 state, the UEFI flag 125 of the NVRAM 43 maintains the set state, but the registers 211 and 213 are cleared. Therefore, at the time startup by depression of the power button 47 from S4/S5 state, validation of integrity will be automatically performed at block 331 unless an operation to temporarily skip the secure boot function is performed at block 304. Accordingly, the secure boot function can be skipped only for boot this time while maintaining the enabled setting by default of the secure boot function.

When the secure boot function is skipped, the possibility of execution of a virus-contaminated program by malware may be increased. In the present embodiment, since PP bit is set and the secure boot function is skipped only when the user actually operates the laptop PC 10, such a security risk can be reduced. Further, the supervisor password 121 set prevents a third party from skipping the secure boot function of the laptop PC 10, and so the security risk further can be reduced.

The temporary cancellation of the secure boot function can be implemented by cancellation of the UEFI flag 125 only for boot this time as well. More specifically, when the power button 47 is depressed and the keyboard 37 is operated to set PP bit and DE bit, the execution path control code 107 temporarily clears the UEFI flag 125 to set the secure boot function as disabled for skipping of integrity validation. The execution path control code 107 sets the UEFI flag 125 again before loading the OS. In this case, however, a countermeasure is required to avoid the clearance of the UEFI flag 125 when the power supply stops after clearing of the UEFI flag 125 and before setting the UEFI flag 125 again.

Another Hardware Configuration to Control Secure Boot Function

Figure 6:
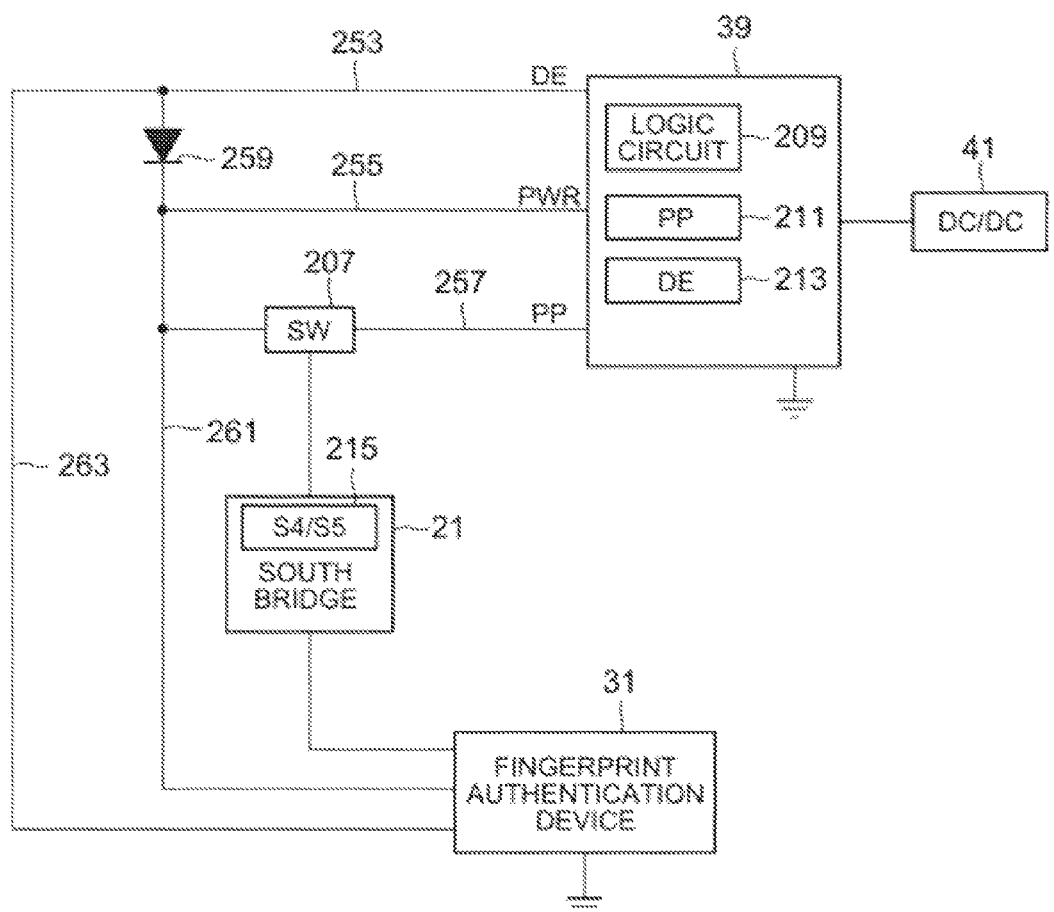
FIG. 6 is a functional block diagram illustrating another configuration of hardware to control the secure boot function.

FIG. 1 to FIG. 5 describes the method of temporarily cancelling the secure boot function by operating the power button 47 and the keyboard 37. The temporary cancellation of the secure boot function may be performed using the fingerprint authentication device 31. FIG. 6 is a functional block diagram illustrating the configuration of hardware to temporarily cancel the secure boot function by fingerprint authentication using the fingerprint authentication device 31. In FIG. 6, the same reference numerals are assigned to the same elements as those in FIG. 5, and their descriptions are omitted.

The fingerprint authentication device 31 receives electric power even in S4/S5 state. The fingerprint authentication device 31 outputs two startup signals through lines 261 and 263 depending on the types of fingers to be authenticated. For instance, in the case of authentication of an index finger, a startup signal may be output through the line 261, and in the case of authentication of a middle finger, a startup signal may be output through the line 263. The line 261 is connected to a startup signal line 255, one end of a switch 207 and a cathode of a diode 259. The line 263 is connected to a DE bit setting line 253 and an anode of the diode 259.

The DE bit setting line 253 is connected to a power controller 39. The cathode of the diode 259 is connected to the startup signal line 255 and the switch 207. Receiving a startup signal through the DE bit setting line 253, a logic circuit 209 sets DE bit at a register 211. When a user swipes the index finger for authentication in the state where the system is in S4/S5 state and the authentication succeeds, the power controller 39 receives a startup signal through the startup signal line 255 and a PP bit setting line 257. At this time, since DE bit is not set at a register 213, the processing by the UEFI firmware 100 is via the path at block 331 of FIG. 5, so that the secure boot function becomes enabled.

When a user swipes the middle finger for authentication in the state where the system is in S4/S5 state and the authentication succeeds, the power controller 39 receives a startup signal through the DE bit setting line 253, the startup signal line 255 and the PP bit setting line 257. At this time, since the logic circuit 209 sets PP bit at the register 211 and sets DE bit at the register 213, the processing by the UEFI firmware 100 is via the path at block 315 of FIG. 5, so that the secure boot function becomes disabled.

That is the description of the present invention by way of specific embodiments illustrated in the drawings. The present invention, however, is not limited to the embodiments illustrated in the drawings, and any known configuration can be used as long as it has the effects of the present invention.

DESCRIPTION OF SYMBOLS

10 Laptop PC
47 Power button
209, 211, 215 Register

What is claimed is:

1. A method for loading a boot program without validation of integrity of the boot program in a computer configured to set a secure boot function as enabled by default, the secure boot function being for validation of integrity of a boot program, comprising the steps of:
   activating a power supply in response to a startup signal;
   generating a first signal indicating physical presence when the startup signal is generated in accordance with an operation by a user who physically accesses the computer in a power-off state;
   generating a second signal in accordance with a user's operation for each startup in response to receiving keyboard input from a predefined function key within a predetermined time after startup; and
   loading the boot program while skipping the validation of integrity by the secure boot function only for boot this time when the first signal and the second signal are generated, the secure boot function comprising a unified extensible firmware interface (UEFI), the computer having access to at least one boot program that is compatible with the UEFI and at least one boot program that is not compatible with the UEFI, wherein the boot program being loaded while skipping the validation of integrity comprises an operating system that is not compatible with the UEFI.

2. The method according to claim 1, wherein the loading is executed without rebooting the system.

3. The method according to claim 1, further comprising the step of requesting input of a password set for the computer, wherein the loading is executed only when the password is authenticated successfully.

4. The method according to claim 1, wherein when any one of the first signal and the second signal or both of the signals are not generated, the loading is performed after validation of integrity of the boot program.

5. The method according to claim 4, further comprising the step of, when the validation of integrity fails, selecting another boot device storing a boot program to validate integrity of the boot program stored in the other boot device.

6. The method according to claim 1, wherein the step of loading the boot program while skipping the validation of integrity includes displaying a selection screen of boot devices.

7. The method according to claim 1, wherein the step of generating the second signal in accordance with a user's operation includes depression of a key on a keyboard.

8. The method according to claim 1, wherein, in response to validation of a first finger by a fingerprint authentication device, the startup signal and the first signal are generated, and, in response to validation of a second finger by the fingerprint authentication device, the startup signal, the first signal, and the second signal are generated.

9. A method for booting an operating system without validation of integrity of the operating system in a computer configured to set a secure boot function as enabled by default, the secure boot function being for validation of integrity of an operating system, comprising the steps of:
- activating a power supply in response to a startup signal;
- generating a first signal indicating physical presence when the startup signal is generated in accordance with an operation by a user who physically accesses the computer in a power-off state;
- generating a second signal in accordance with a user's operation before booting the operating system in response to receiving keyboard input from a predefined function key within a predetermined time after startup; and
- when the first signal and the second signal are generated, booting the operating system while skipping the validation of integrity by the secure boot function and without rebooting the system, the secure boot function comprising a unified extensible firmware interface (UEFI), the computer having access to at least one boot program that is compatible with the UEFI and at least one boot program that is not compatible with the UEFI, wherein the boot program being loaded while skipping the validation of integrity comprises an operating system that is not compatible with the UEFI.

10. The method according to claim 9, wherein the first signal and the second signal are cleared before next boot.

11. A computer capable of loading a boot program stored in a storage device, comprising:
- a processor;
- a non-volatile memory that stores firmware;
- a secure boot flag to set a secure boot function as enabled by default, the secure boot function being for validation of integrity of a boot program;
- a first flag indicating physical presence that is set when a startup signal is generated by a user who physically accesses the computer in a power-off state; and
- a second flag set in accordance with an operation by the user at startup this time in response to receiving keyboard input from a predefined function key within a predetermined time after startup;
- wherein when the secure boot flag is set, the processor executing the firmware loads the boot program after the validation of integrity in response to the startup signal, and when the first flag and the second flag are set, the processor loads the boot program while skipping the validation of integrity by the secure boot function in response to the startup signal only for boot this time irrespective of setting of the secure boot flag, the secure boot function comprising a unified extensible firmware interface (UEFI), the computer having access to at least one boot program that is compatible with the UEFI and at least one boot program that is not compatible with the UEFI, wherein the boot program being loaded while skipping the validation of integrity comprises an operating system that is not compatible with the UEFI.

12. The computer according to claim 11, wherein the second flag is set after generation of the startup signal and before loading of the boot program.

13. The computer according to claim 11, wherein, when a fingerprint authentication device succeeds in authentication, the first flag and the second flag are set.

14. The computer according to claim 11, wherein, when a supervisor password is set in the computer and only when the supervisor password is authenticated successfully, the processor executing the firmware skips the validation of integrity.

15. A computer capable of booting an operating system stored in a storage device, comprising:
- a processor;
- a non-volatile memory that stores firmware;
- a secure boot flag to set a secure boot function as enabled by default, the secure boot function being for validation of integrity of an operating system;
- a first flag indicating physical presence that is set when a startup signal is generated by a user who physically accesses the computer in a power-off state; and
- a second flag set in accordance with an operation by the user before booting the operating system in response to receiving keyboard input from a predefined function key within a predetermined time after startup;
- wherein when the secure boot flag is set, the processor executing the firmware loads the operating system after the validation of integrity in response to the startup signal, and when the first flag and the second flag are set, the processor boots the operating system while skipping the validation of integrity by the secure boot function and without rebooting the system in response to the startup signal irrespective of setting of the secure boot flag, the secure boot function comprising a unified extensible firmware interface (UEFI), the computer having access to at least one boot program that is compatible with the UEFI and at least one boot program that is not compatible with the UEFI, wherein the boot program being loaded while skipping the validation of integrity comprises an operating system that is not compatible with the UEFI.

16. The computer according to claim 15, wherein when the first flag and the second flag or any one of the flags is not set, the processor executing the firmware boots the operating system after the validation of integrity.

17. A computer program stored in a non-transitory storage medium making a computer implement functions, the computer having a power supply being activated in response to a startup signal generated in a power-off state of the computer, the functions including:
- setting a secure boot function as enabled by default, the secure boot function being for validation of integrity of a boot program;
- checking a first signal indicating physical presence when the startup signal is generated by an operation by a user who physically accesses the computer;
- checking a second signal generated in accordance with a user's operation at startup time in response to receiving keyboard input from a predefined function key within a predetermined time after startup; and
- when the first signal and the second signal are generated, loading the boot program while skipping the validation of integrity by the secure boot function only for boot this time, the secure boot function comprising a unified extensible firmware interface (UEFI), the computer having access to at least one boot program that is compatible with the UEFI and at least one boot program that is not compatible with the UEFI, wherein the boot program being loaded while skipping the validation of integrity comprises an operating system that is not compatible with the UEFI.

18. The computer program according to claim 17, wherein the computer program makes the computer implement the function of the loading without setting the secure boot function set by default as disabled.

19. A computer program stored in a non-transitory storage medium making a computer implement functions, the computer having a power supply being activated in response to a startup signal generated in a power-off state of the computer, the functions including:

setting a secure boot function as enabled, the secure boot function being for validation of integrity of a boot program;

checking a first signal indicating physical presence when the startup signal is generated by an operation by a user who physically accesses the computer;

checking a second signal generated in accordance with a user's operation before booting an operating system in response to receiving keyboard input from a predefined function key within a predetermined time after startup; and when the first signal and the second signal are generated, booting the operating system while skipping the validation of integrity of the operating system by the secure boot function and without rebooting the system irrespective of enabled setting of the secure boot function, the secure boot function comprising a unified extensible firmware interface (UEFI), the computer having access to at least one boot program that is compatible with the UEFI and at least one boot program that is not compatible with the UEFI, wherein the boot program being loaded while skipping the validation of integrity comprises an operating system that is not compatible with the UEFI.

20. The computer program according to claim 19, wherein the function of the booting includes a function of requesting password authentication.

\* \* \* \* \*